United States Patent
Pospiech et al.

(10) Patent No.: US 10,359,617 B2
(45) Date of Patent: Jul. 23, 2019

(54) MICROSCOPE

(71) Applicant: Carl Zeiss Microscopy GmbH, Jena (DE)

(72) Inventors: Matthias Pospiech, Hannover (DE); Reiner Mitzkus, Goettingen (DE); Marzena Franek, Hannover (DE); Peter Westphal, Jena (DE)

(73) Assignee: Carl Zeiss Microscopy GmbH, Jena (DE)

( * ) Notice: Subject to any disclaimer, the term of this patent is extended or adjusted under 35 U.S.C. 154(b) by 24 days.

(21) Appl. No.: 15/585,828

(22) Filed: May 3, 2017

(65) Prior Publication Data
US 2017/0322409 A1    Nov. 9, 2017

(30) Foreign Application Priority Data

May 3, 2016  (DE) .................. 10 2016 108 226

(51) Int. Cl.
*G02B 21/36* (2006.01)
*G02B 21/34* (2006.01)
*G02B 21/24* (2006.01)

(52) U.S. Cl.
CPC ......... *G02B 21/365* (2013.01); *G02B 21/244* (2013.01); *G02B 21/245* (2013.01); *G02B 21/34* (2013.01)

(58) Field of Classification Search
CPC .... G02B 21/365; G02B 21/244; G02B 21/34; G02B 21/245
USPC ........................................................... 348/79
See application file for complete search history.

(56) References Cited

U.S. PATENT DOCUMENTS

| | | | |
|---|---|---|---|
| 7,071,451 B2 | 7/2006 | Ishikawa et al. | |
| 7,660,523 B2 | 2/2010 | Okamoto | |
| 8,143,562 B2 | 3/2012 | Kawanabe | |
| 2007/0102620 A1 | 5/2007 | Bublitz et al. | |
| 2007/0152130 A1 | 7/2007 | Fomitchov | |
| 2010/0033811 A1 | 2/2010 | Westphal et al. | |
| 2010/0294749 A1* | 11/2010 | Kempe ............ | B23K 26/046 219/121.72 |
| 2011/0043905 A1 | 2/2011 | Mitzkus et al. | |
| 2011/0051232 A1 | 3/2011 | Steinborn et al. | |
| 2013/0128025 A1 | 5/2013 | Dyba et al. | |

(Continued)

FOREIGN PATENT DOCUMENTS

DE    102008018952 A1    10/2009

*Primary Examiner* — Hee-Yong Kim
(74) *Attorney, Agent, or Firm* — Skaar Ulbrich Macari, P.A.

(57) ABSTRACT

A microscope includes a holder for holding a sample, an objective for imaging at least apart of a sample held by the holder, a detection module, a control unit for setting the focus position of the objective in a first direction for the recording by means of the detection module, and a focusing module for maintaining a set focus position of the objective. The focusing module includes the control unit, a second detector and first focusing optics with adjustable focal length. The focusing module is switchable into a focus-hold mode, wherein an intensity-modulated object is imaged into the sample via the first focusing optics and the objective, and an image of the imaged object is recorded by means of the second detector. The control unit holds the focus position of the objective on the set focus position, based upon the recording of the second detector.

16 Claims, 7 Drawing Sheets

(56) References Cited

U.S. PATENT DOCUMENTS

| | | |
|---|---|---|
| 2014/0168402 A1 | 6/2014 | Fuller et al. |
| 2014/0168404 A1 | 6/2014 | Westphal et al. |
| 2015/0146081 A1 | 5/2015 | Oshima et al. |
| 2015/0309297 A1 | 10/2015 | Westphal et al. |

* cited by examiner

MICROSCOPE

PRIORITY

This application claims the benefit of German Patent Application No. 102016108226.0, filed on May 3, 2016, which is hereby incorporated herein by reference in its entirety.

FIELD

The present invention relates to a microscope with a holder for holding a sample, an objective for imaging at least a part of a sample held by the holder, a detection module, downstream of the objective, with a first detector for recording the part of the sample imaged by the objective, a control unit for setting the focus position of the objective in a first direction for the recording by means of the detection module, and a focusing module, downstream of the objective, for maintaining a set focus position of the objective.

BACKGROUND

Microscopes are known, for example, from WO 2007/144197 A1. The focusing module there can comprise the control unit, a second detector and first focusing optics, and can be switchable into a focus-hold mode, in which an intensity-modulated object is imaged into the sample via the first focusing optics and the objective, and an image of the imaged object is recorded by means of the second detector and, in addition, the control unit holds the focus position of the objective on the set focus position, on the basis of the recording of the second detector.

In the case of such a microscope, although it is possible to focus deeply into the sample, in this case it is no longer possible to implement the focus-hold mode of the focusing module, since the image of the imaged object is no longer incident on the second detector.

SUMMARY

Disclosed is a microscope that addresses the difficulties described above. The disclosure includes a microscope where the first focusing optics are provided with an adjustable focal length. It is thus possible to shift a capture range, which is present in the case of a set focal length of the first focusing optics, in the first direction by adjustment of the focal length of the first focusing optics themselves in the first direction, with the result that a larger total capture range is present overall. By the capture range in the case of a set focal length is meant here, in particular, that a set focus position lying within the capture range can be held by means of the first focusing optics, and a set focus position lying outside of the capture range cannot be held.

The shifting of the capture range can be carried out in and contrary to the first direction in order to bring a set focus position lying above or below the capture range into the capture range. It is thus possible to provide a significantly higher capture range, compared with the case in which no shifting of the capture range is possible.

The focusing module can be formed such that it is switchable into a search mode, in which, if no image of the imaged object can be recorded by means of the second detector, with the focus position of the objective being maintained, the focal length of the first focusing optics is altered until the second detector records an image of the imaged object. In this case, the focusing module can then be switched back into the focus-hold mode, with the result that the desired maintenance of the set focus position can be carried out.

The focusing module can be switchable into a focus-setting mode, in which, in a first step, by alteration of the distance between the objective and the holder, the position of the image of the imaged object on the second detector coincides with a predefined position which corresponds to a focus position of the objective that is to be set, and in which, in a second step following the first step, the focusing module is switched into the focus-hold mode. Targeted movement towards a focus position is thus possible.

For the first step, the focus position of the imaged object can be set such that it lies at a greater distance from the objective than the focus position of the objective, and in the second step the focal length of the first focusing optics can be altered such that the focus position of the imaged object coincides with the focus position of the objective.

Thus, in the setting of the focus position that is to be set, the objective can be reliably prevented from moving towards the sample, since effectively a greater working distance is predefined for the setting operation. This working distance is then adjusted again in the second step such that the two focus positions coincide.

The focusing module can be switchable into a first z-stack mode, in which various focal lengths of the first focusing optics are set successively with the focus-hold mode switched on, with the result that the focus position of the objective is thereby set to the positions in the first direction which are assigned to the various focal lengths. The desired recordings can then be carried out at the respective focus positions, with the result that, overall, the z-stack recordings can be obtained.

The focusing module can be switchable into a second z-stack mode, in which various setpoint values are successively predefined for the focus-hold mode, with the result that the corresponding focus positions of the objective are thereby set. In this case, also, the desired recordings for the z-stack can then be carried out at the corresponding focus positions.

The focal length of the first focusing optics can be altered in the second z-stack mode, in order to be able to scan a larger z-stack range.

The intensity-modulated object can be, in particular, a ruled grating. Further, the intensity-modulated object can be generated by means of a two-dimensional imager, such as, for example, by means of an LCD module.

The recording of the imaged object by means of the second detector can be preferably carried out such that the image plane recorded by the second detector intersects the set focus position (or the sample plane recorded by the detection module). In other words, the detector can be tilted with respect to the optical axis of the objective and thus assume an angle other than 90°. Naturally, it is also possible to achieve the desired orientation of the recorded image and of the focus position in that the intensity-modulated object is imaged into the sample such that the imaging of the intensity-modulated object intersects the focal plane.

The second detector can be, in particular embodiments, an area detector. A spatially resolved intensity signal can be recorded with the second detector. This intensity signal can be converted into a contrast signal, e.g. by the control unit. In particular, the envelope curve of the grating contrast signal can be used for evaluation. In this case, in particular, the maximum or the centroid of the envelope curve can be taken into account. The principle of measurement for the focus-hold mode can be realized in the same way as in WO 2007/144197 A1. The corresponding content of WO 2007/144197 A1 is hereby incorporated in the present application by reference.

The recording of the imaged object by means of the second detector can be preferably effected via the objective and the first focusing optics. In particular, in this case, the entire pupil is used for recording the imaged object.

The focusing module can image the intensity-modulated object, in particular, to infinity, with the result that it can then be imaged into the sample by means of the objective. In particular, in the imaging of the intensity-modulated object, a 1:1 imaging can be carried out.

For a microscope, owing to the provision of the two detectors, the recording of the image can be carried out simultaneously with the holding of the set focus position.

The control unit of the focusing module can carry out, in particular, the reading-out of the second detector. Further, the control unit can evaluate the position of the grating envelope curve on the second detector and use it for position correction of the z-position (in the first direction) of the focus position. Furthermore, the control unit can control a z-drive of the objective for the purpose of focus correction. Naturally, any other manner of altering the z-position of the focus is also possible. Further, the control unit can set, and also adjust, the focal length of the first focusing optics. Furthermore, the control unit can evaluate an input signal for the purpose of selecting the corresponding mode of the focusing module, and then implement the corresponding mode.

The first focusing optics can also be called first tube optics.

The microscope can be formed as a wide-field microscope or also as a laser scanning microscope. Further, the microscope can be formed as a reflected-light microscope or as a transmitted-light microscope. Other types of design of the microscope are also possible.

It is understood that the features mentioned above and those yet to be explained below can be used, not only in the stated combinations, but also in other combinations or singly, without departing from the scope of the present invention.

Figure 1:
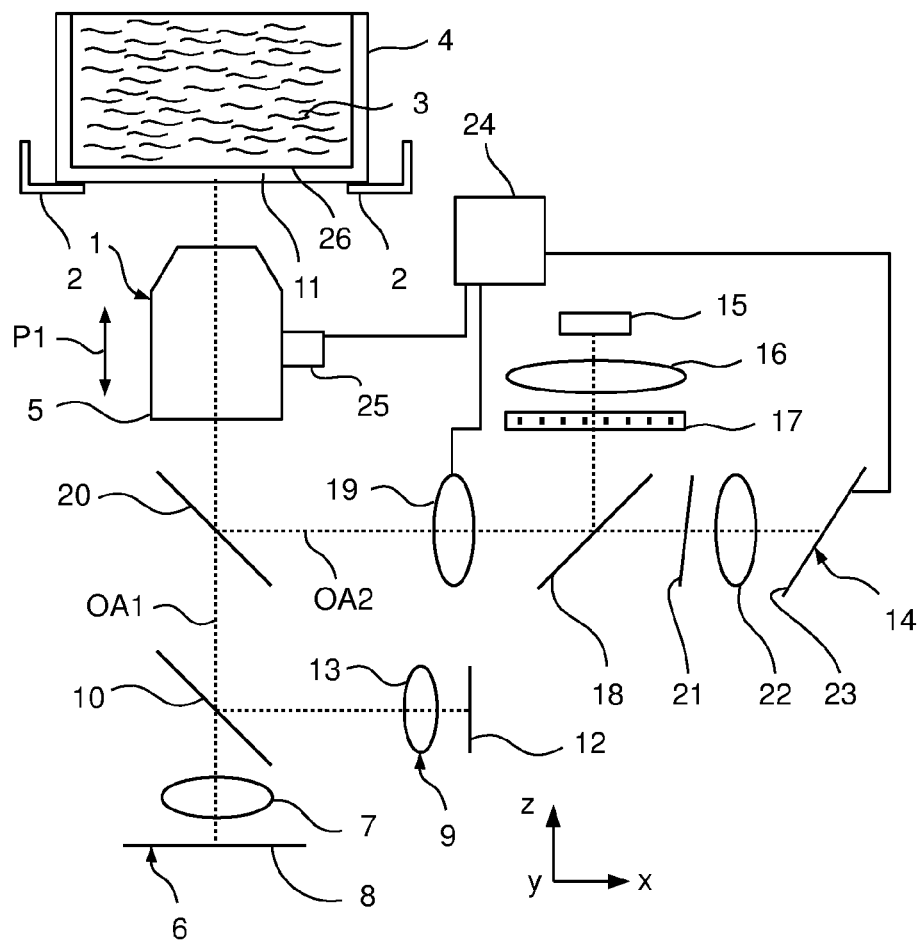
FIG. 1 is a schematic representation of a first embodiment of the microscope according to the invention.

While the invention is amenable to various modifications and alternative forms, specifics thereof have been shown by way of example in the drawings and will be described in detail. It should be understood, however, that the intention is not to limit the invention to the particular example embodiments described. On the contrary, the invention is to cover all modifications, equivalents, and alternatives falling within the scope of the invention as defined by the appended claims.

DETAILED DESCRIPTION

In the following descriptions, the present invention will be explained with reference to various exemplary embodiments. Nevertheless, these embodiments are not intended to limit the present invention to any specific example, environment, application, or particular implementation described herein. Therefore, descriptions of these example embodiments are only provided for purpose of illustration rather than to limit the present invention.

Referring to FIG. 1, the microscope 1 according to the invention comprises a holder 2 for holding a sample 3. Here, the sample 3 is an aqueous sample 3, which is held in a Petri dish 4 by the holder 2.

The microscope 1 further comprises an objective 5 and, downstream of the objective 5, a detection module 6 with detection optics 7 and a first detector 8. The objective 5 and the detection module 6 have a common optical axis OA1.

The microscope 1 further has an illumination module 9, the illumination light or illumination radiation of which is coupled, via a first beam splitter 10, into the beam path between the detection optics 7, which can also be called tube optics 7, and the objective 5 such that the desired illumination of the sample 3 is effected via the objective 5. The sample 3 to be imaged, or the part of the sample 3 to be imaged, is located e.g. directly on or close to the base 11 of the Petri dish 4. The illumination module 9 can have a corresponding light source 12 and illumination optics 13, in order to be able to carry out the desired illumination.

By means of the objective 5 and the detection optics 7, the desired part of the sample 3 is imaged onto the detector 8. An immersion medium (not shown), such as e.g. water, oil or glycerol, can be provided between the objective 5 and the base 11 of the Petri dish 4. Alternatively, it is also possible to omit the immersion medium. In this case, there is, for example, air between the objective 5 and the base 11 of the Petri dish 4. The plane in the sample 3 which is imaged sharply onto the detector 8 by means of the objective 5 and the detection optics 7 is also called the sample plane or visual focus position in the following.

Furthermore, the microscope 1 according to the invention comprises a focusing module 14, with which a predetermined or set visual focus position of the detection module 6 can be maintained, as described in detail in the following.

Figure 2:
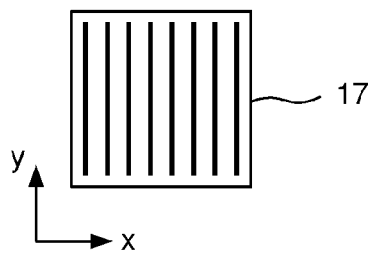
FIG. 2 is a schematic top view of the line transmission grating from FIG. 1.

The focusing module 14 comprises an LED 15, which emits radiation with a wavelength centroid of 850 nm, illumination optics 16, which are downstream of the LED 15 and which serve to illuminate uniformly a line transmission grating 17, represented in top view in FIG. 2, which is downstream of the illumination optics 16. Downstream of the line transmission grating 17, in this sequence, are a beam splitter 18 (e.g. a 50% beam splitter), first tube optics 19 with adjustable focal length, and a beam combiner 20, wherein the beam combiner 20 is arranged between the detection module 6 and the objective 5. The first tube optics 19 are also called the first focusing optics 19 in the following. Further, the focusing module 14 comprises a barrier filter 21, second tube optics 22 and a second detector 23.

The microscope 1 further has a control unit 24, which is connected to the second detector 23, the first tube optics 19 and a z-drive 25 of the objective 5. The control unit 24 can be part of the focusing module 14.

During operation, a user can set the visual focus position of the detection module 6, and therefore the sample plane, by moving the objective 5 along the optical axis OA1, as represented schematically by the double arrow P1. For example, the sample plane can lie at the boundary surface 26 between the base 11 of the Petri dish 4 and the aqueous sample 3. The objective 5 can be moved by means of the z-drive 25 or by means of a further drive, not shown.

In order to maintain this set sample plane automatically over a predetermined time period, the focusing module 14 (which is also called focus-hold in the following) carries out a stabilization, as follows. It can also be said that the focusing module 14 is switched into a focus-hold mode. The line transmission grating 17, illuminated as uniformly as possible by means of the LED 15 and the illumination optics 16, is imaged to infinity via the beam splitter 18 and the first tube optics 19 and, via the beam combiner 20, is coupled into the beam path between the detection optics 7 and the objective 5, with the result that, via the objective 5, the ruled grating is imaged into a focal plane (which is also called focus-hold plane in the following). A reflection of the image of the ruled grating takes place at the boundary surface 26, with the result that the reflected grating image passes through the objective 5 and is coupled out by the beam combiner 20 in the direction of the first tube optics 19, and is then incident on the second detector 23, via the beam splitter 18, the barrier filter 21 and the second tube optics 22. By means of the barrier filter 21, which e.g. blocks radiation with a wavelength of less than 800 nm and transmits radiation with a wavelength of at least 800 nm, it can be ensured that the reflected grating image is imaged onto the second detector 23, and that the reflected illumination radiation of the illumination module 9 is not incident on the second detector 23. The second detector 23 is oblique to the optical axis OA2 of the focusing module 14 (the detector 23 encloses an angle other than 90° with the optical axis OA2), and therefore also oblique to the optical axis OA1 of the detection module 6, with the result that the grating contrast recorded by means of the second detector 23 has a Gaussian distribution in the z direction, wherein the maximum of this distribution corresponds to the reflection at the boundary surface 26, and the position of the maximum on the second detector 23 corresponds to the position of the focal plane (or the focus-hold plane) in the z direction. The principle of measurement is the same as in WO 2007/144197 A1, the content or principle of measurement of which is referred to here.

Figure 3:
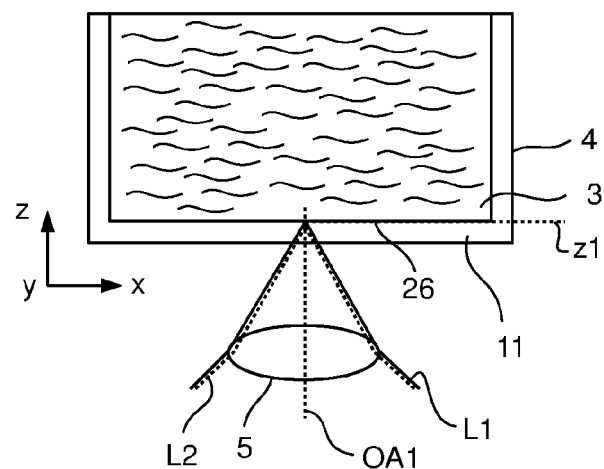
FIG. 3 is an enlarged schematic representation to explain the beam path of the detection module and the beam path of the focusing module from FIG. 1.

It is shown in a schematic representation in FIG. 3 that the beam path of the detection module 6 and the beam path of the focusing module 14 are coordinated such that the sample plane coincides with the focus-hold plane. In the case of the imaging beam path being focused onto the boundary surface 26 (if the sample plane lies in the boundary surface 26), the focal plane of the focusing module 14 likewise lies in the boundary surface 26. Since the reflection of the grating image at the boundary surface 26 is detected by means of the second detector 23, the boundary surface 26 is also called reference plane of the focusing module 14. The position of the boundary surface 26 is denoted by z1 in FIG. 3, and in FIG. 3 the beam path of the detection module 6 is represented by unbroken lines L1 and the beam path of the focusing module 14 is represented by broken lines L2.

Figure 4:
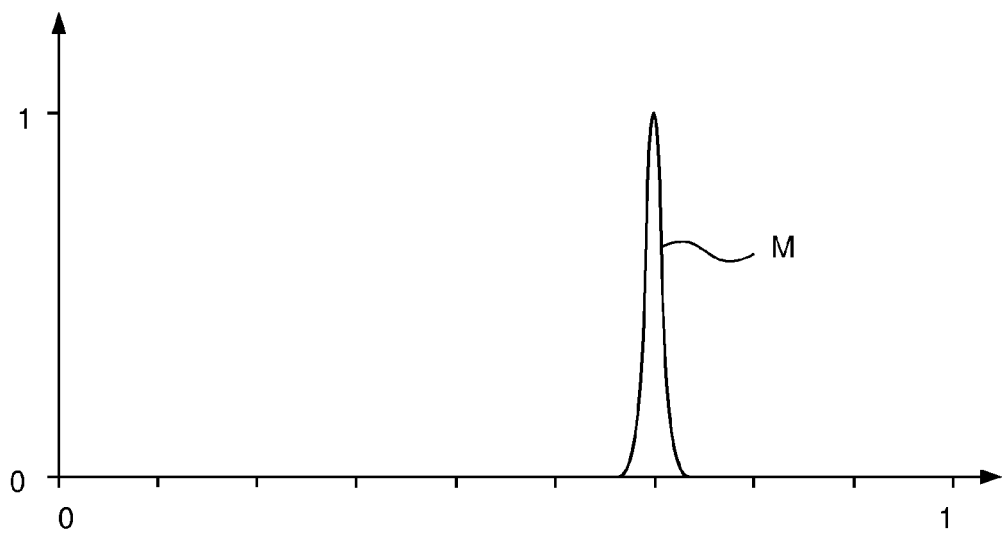
FIG. 4 is a schematic representation of an envelope curve of the grating contrast of the recording of the beam transmission grating imaged into the sample.

The corresponding envelope curve M of the grating contrast of the imaging onto the second detector 23 is represented in FIG. 4, wherein the z-position is plotted along the x-axis in FIG. 4 and the grating contrast on the second detector 23 is plotted along the y-axis in FIG. 4. Both axes in FIG. 4 are normalized to one, wherein the range from zero to one of the x-axis in FIG. 4 is the range along the z-axis in FIG. 1, and therefore along the optical axis OA1 of the detection module 6, in which the sample plane can lie and there is still an evaluable contrast image on the second detector 23.

The envelope curve M shown in FIG. 4 shifts e.g. to the left if the sample plane moves into the sample 3 (upwards in FIG. 1). Such a movement corresponds to a shift of the position of the sample plane in the +z direction. As shown schematically in FIG. 5, the sample plane can then lie at z2. This altered position of the sample plane can be e.g. the result of an undesired thermal drift of the microscope 1. Since the two beam paths are coordinated to each other, as described, owing to the reflection at the boundary surface 26 the grating image is now imaged in front of the sample plane, which results in the envelope curve M on the second detector 23 being shifted to the left, as shown in FIG. 6. If, in the case of the focus state according to FIG. 4, the focusing module 14 is switched into the stabilization mode, this shift of the envelope curve M is evaluated by means of the control unit 24, which then controls the z-drive 25 such that the sample plane again coincides with the boundary surface 26. The controlling of the z-drive 25 is therefore effected such that the envelope curve M is again in the position according to FIG. 4. Thus, by means of the focusing module 14, a position of the sample plane, once set, can be maintained durably. Naturally, it can also be the case that, with the focusing module 14 switched off, a user intentionally selects the position of the sample plane shown in FIG. 5, since for the user that is where the part of the sample 3 that is of interest is located. Once he has selected this position, the user switches the focusing module 14 on, with the result that it holds the envelope curve M in the position shown in FIG. 6, whereby the sample plane is held durably in z2.

There is thus a so-called capture range in the z direction, which contains all possible sample plane positions in the z direction that can be held by the focusing module 14.

Figure 5:
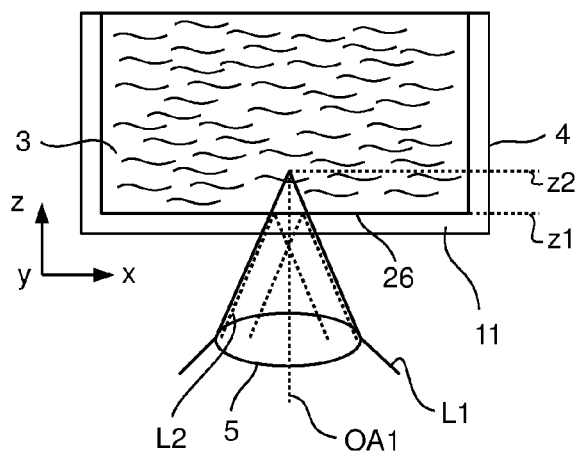
FIG. 5 is an enlarged schematic representation to explain the beam path of the detection module and the beam path of the focusing module from FIG. 1.
Figure 6:
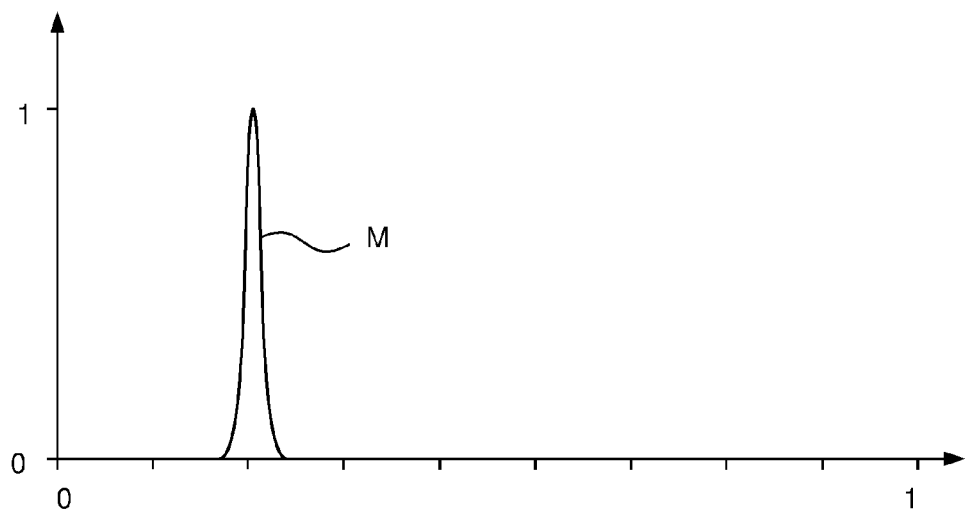
FIG. 6 is a schematic representation of an envelope curve of the grating contrast of the recording of the beam transmission grating imaged into the sample.

If, starting from the position of the sample plane according to FIGS. 5 and 6, there is focusing further into the sample 3, the maximum of the envelope curve M in FIG. 6 will migrate further to the left, and from a certain point onwards will no longer be imaged onto the second detector 23. In this case, the set focus can no longer be held, since it has effectively left the capture range.

Figure 7:
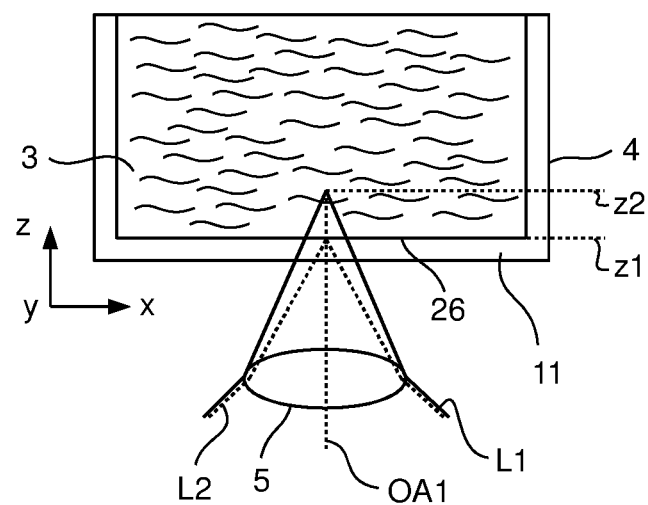
FIG. 7 is an enlarged schematic representation to explain the beam path of the detection module and the beam path of the focusing module from FIG. 1.

In the case of the microscope 1 according to the invention, however, the first tube optics 19 are provided with variable focal length, with the result that e.g. in the case of a position, selected by the user, of the sample plane beyond the position according to FIG. 6, the focal length is altered such that the maximum of the envelope curve M again lies at the position according to FIG. 4. The grating image is effectively drawn back into the reference plane or boundary surface 26, as represented in FIG. 7. In this case, there is an offset between the two beam paths, of the detection module 6 and of the focusing module 14 (or between the position of the sample plane and the position of the focus-hold plane). Owing to this offset, however, in the case of the focusing module 14 being switched on, the set focus or the set position of the sample plane according to FIG. 7 can be held.

Thus, a larger capture range or a larger range in the z direction can be provided for sample plane positions by means of the microscope 1 according to the invention. The first tube optics 19 can be equipped with an encoder (not shown), via which the focal length can be set. If e.g. the required offset is known, as a result of the desired focusing (and therefore the position of the sample plane) being predefined by the operator, the control unit 24 can set the focal length of the first tube optics 19, with knowledge of the calibration (dependence between position of the reference plane and position of the sample plane) such that the focus-hold signal or the centroid of the envelope curve M lies on the second detector 23, and thus in the capture range of the focus-hold.

It is also possible to form the microscope 1 such that it carries out an autonomous search for the grating imaging. For this purpose, the focusing module is switched into a search mode, in which the focal length of the first tube optics 19 is traversed in its adjustment range until the second detector 23 detects the grating image. If the control unit 24 takes account of the previous z-positions of the sample plane, it is frequently already possible to determine whether the search is to be carried out in the plus-z direction (and thus upwards in FIG. 1) or in the minus-z direction. This results in a higher control rate.

The microscope according to the invention can also be operated in a focus-setting mode such that the detection module 6 is focused onto a predetermined z-position. As has been explained in connection with FIGS. 3 to 6, each position of the maximum of the envelope curve M (or also of the centroid of the envelope curve M) corresponds to a z-position of the sample plane. The position of the maximum of the envelope curve M (or of the centroid of the envelope curve M) can therefore be set by adjusting the objective 5, via the z-drive 25, to a desired value. In this process, there is the risk of running against the Petri dish 4 if e.g. the working distance of the objective 5 is relatively small. In order to avoid this, the focus position (or the position of the focus-hold plane) of the focusing module 14 can be set, by means of the first tube optics 19 with variable focal length, further from the front side of the objective 5 than the focus position, and therefore than the sample plane of the detection module 6.

The optical and mechanical working distance for the detection of the focus-hold beam path has thereby been increased, and it is possible to search for the focus position with a significantly less constrained distance towards the Petri dish 4. When the grating signal has been found, it can be set to the desired focus position according to FIG. 4 or 6. However, the visual focus position, and therefore the focus position of the detection optics 6, has not yet been coordinated to the focus-hold position. With active control of the focus-hold (or if the focusing module 14 has been switched into the stabilization state), the first tube optics 19 with variable focal length can then be moved to the encoder value which corresponds to the comparable imaging state of the focus-hold. This means that both focus positions, that of the focus-hold (or of the focusing module 14) and that of the visual imaging (or of the detection module 6) overlap. With control of the focus-hold 14 switched on, the z-position is thus moved automatically into the focus of the visual imaging.

The first tube optics 19 with variable focal length can also be used to search for the visual focus position. In the event of the focus-hold 14 losing its grating signal on the second detector 23 (this can occur e.g. if the focus-hold 14 has been switched off or if the microscope 1 has lost its focus position as a result of a thermal drift), the distance of the grating focus position can be altered around the visual focus position by adjusting the focal length of the first tube optics 19, without moving the z-drive 25. The grating can be found in the imaging onto the second detector 23. In the case of corresponding calibration, the z travel path of the objective 5 can then be deduced on the basis of the encoder setting of the first tube optics 19, in order to get back into the visual focus position.

The microscope 1 can further be controlled such that z-stack recordings are carried out, wherein the accuracy of the control of the individual z-positions is very high (first z-stack mode of the focusing module 14).

This is achieved in that the distance between the focal plane of the visual imaging (and thus of the sample plane) and the focal plane of the focus-hold imaging (and thus of the focus-hold plane) is altered. This can be effected by the first tube optics 19 of variable focal length. If the value of the adjustment on the first tube optics 19 is known, in order to achieve a defined change in the z direction, and thus by a defined $\Delta z$, the position change can be determined by traversing the focal length of the first tube optics 19, with the control system of the focusing module 14 activated. If the encoder values of the first tube optics 19 are calibrated with the distance between the focal planes of the visual imaging and focus-hold imaging, it is possible to move towards various focal planes, with the focal length of the first tube optics 19 having been predefined, and to keep the focus-hold continuously in its control, since the focus-hold holds the grating imaging in the reference plane. The accuracy of the method is defined principally by the accuracy of the setting of the focal length of the first tube optics 19, which are designed accordingly.

Figure 8:
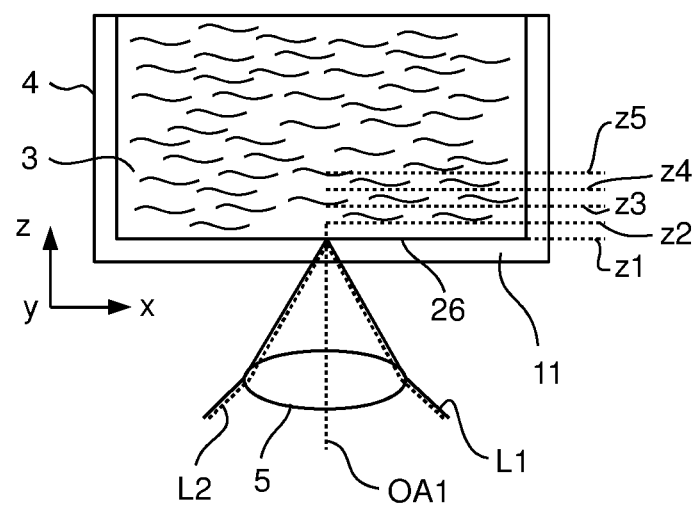
FIGS. 8-10 are representations according to FIG. 3 to explain the movement towards various z-positions.

As shown in FIG. 8, at the start of the z-stack journey (sample plane lies at z1), the focal length of the first tube optics 19, and therefore the corresponding encoder setting, is located in the focus adjustment of the focus-hold beam path and of the microscope beam path (or of the detection module beam path).

Figure 9:
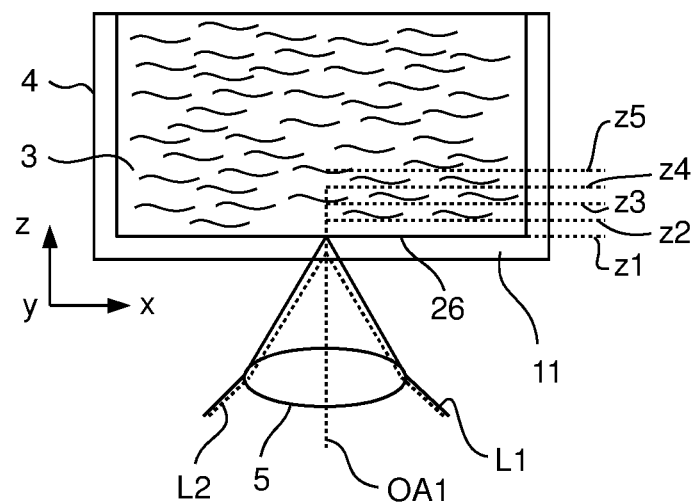
Figure 10:
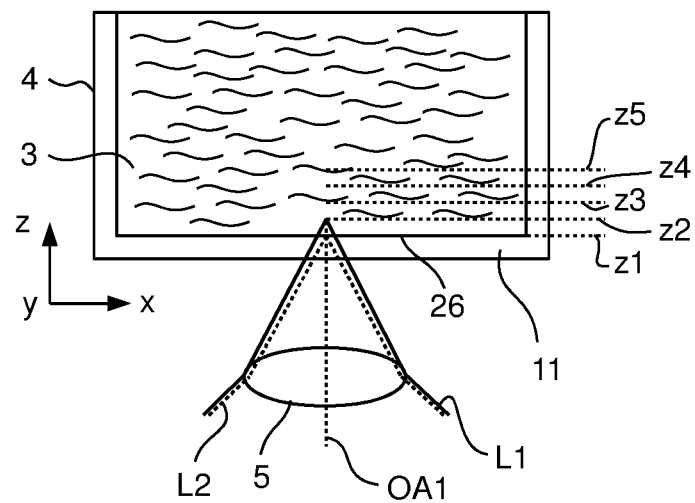

The focal length of the first tube optics 19 is then set such that the desired distance in the z direction ($\Delta z$), in which it is desired to reach or move towards the next-highest focal plane 1 (here at z2), is reached between the focus of the visual imaging and the focus-hold imaging (FIG. 9). The active control of the focus-hold 14 will react immediately and draw the grating imaging back into the reference plane (FIG. 10). As a result, the visual imaging (or the sample plane) has reached the second plane z2, offset by $\Delta z$. This process can be repeated as required in the control range of the first tube optics 19 with variable focal length, until all focal planes (here z3, z4 and z5) of the sample 3 have been reached.

Figure 11:
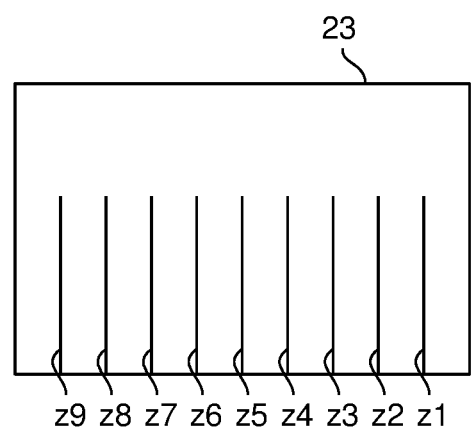
FIG. 11 is a schematic representation of the second detector to explain an alternative possibility for movement towards various z-positions.

It is further possible, on the second detector 23, to define the setpoint position for spaced-apart z-planes (e.g. equidistant z-planes) of the z-stack in corresponding distances of the grating positions on the second detector 23, as represented schematically in FIG. 11 (second z-stack mode of the focusing module 14). In FIG. 11, the corresponding positions for the maximum of the envelope curve M are identified by vertical lines, which are denoted by the associated sample plane positions z1 to z9.

For the purpose of scanning the various z-planes, the focusing module 14 receives the command to hold the z-position of the sample plane successively at the positions z1, z2, z3 . . . zn. Here, n is a whole number greater than 1 and, in the case of the embodiment described, n=9. If the focus-hold is located at the position z1 and receives the command to hold the z-position of the sample plane at z2, movement towards this position is automatic. It is thereby possible to move successively to the desired z-planes.

Figure 12:
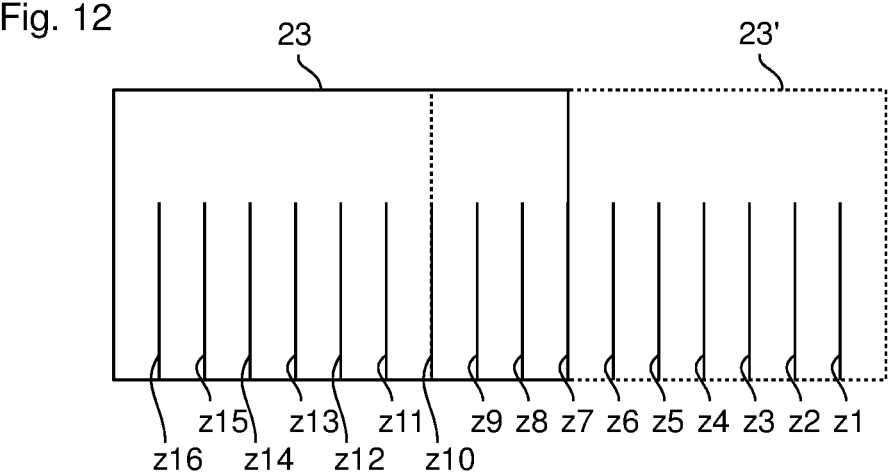
FIG. 12 is a schematic representation of the second detector to explain an alternative possibility for movement towards various z-positions.

Using this procedure, it is possible to move only to z-positions which lie in the capture range (here z1 to z9). If it is necessary to pass through a higher z-stack, the focal length of the first tube optics 19 can be adjusted in a defined manner, in order then to be able to move towards the next z-planes (FIG. 12). The effect of adjusting the focal length corresponds effectively to a widening of the second detector 23, which is therefore represented in FIG. 12 as second detector 23', which corresponds to the setting from FIG. 11, and second detector 23 with the further z-positions z9 to z16 of the sample plane positions.

It is necessary here to note the exact traverse path of the focal length of the first tube optics 19, in order that there is the desired positioning accuracy in the next approach. If this offset is travelled, with this setting of the first tube optics 19, the last set position of z on the second detector 23 can be noted and, following the traversing of the focal length of the first tube optics 19, the new value of the same position on the second detector 23 can be noted. The difference yields the offset that must be taken into account in a new approach. It is thus possible to work with double the accuracy. The process can be repeated multiple times.

The limiting in this procedure results from the maximum traverse path of the focal length of the first tube optics 19 and the limitations of how accurately it is possible to move towards a z-position by means of the focusing module 14. This depends on the objective 5, with the result that it is possible to move towards a z-stack with an accuracy that is dependent on the objective.

The described types of operation or modes of the focusing module 14 can also be combined.

Figure 13:
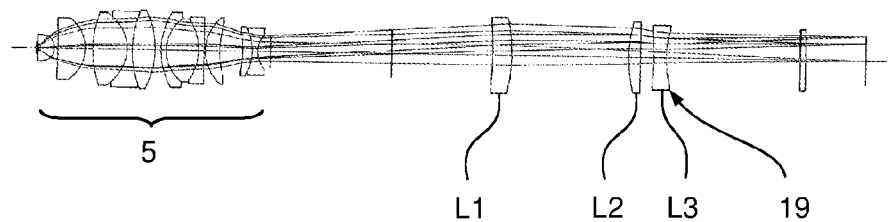
FIGS. 13-15 are lens sections of the objective and of the first tube optics, to explain the adjustable focal length.
Figure 14:
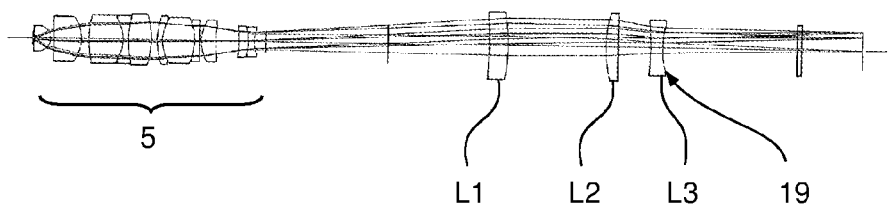
Figure 15:
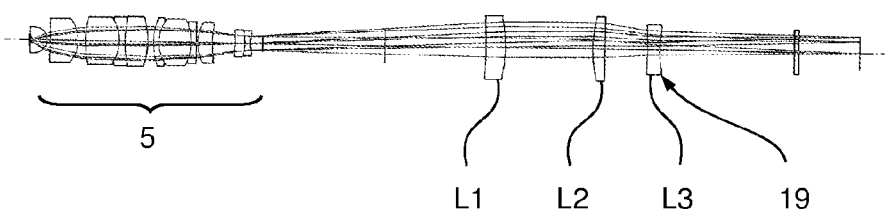

A possible design of the first tube optics 19 with variable focal length is shown in FIG. 13. The first tube optics 19 comprise three lenses L1, L2 and L3, wherein the middle lens L2 can be shifted relative to the two outer lenses L1 and L3, as represented in FIGS. 14 and 15. This alters the overall focal length of the first tube optics 19. The lens L2 can be equipped with a motor drive, including a position encoder (not shown), with the result that the focal length can be set in a targeted manner by motor means.

While the invention has been described in connection with what is presently considered to be the most practical and preferred embodiments, it will be apparent to those of ordinary skill in the art that the invention is not to be limited to the disclosed embodiments. It will be readily apparent to those of ordinary skill in the art that many modifications and equivalent arrangements can be made thereof without departing from the spirit and scope of the present disclosure, such scope to be accorded the broadest interpretation of the appended claims so as to encompass all equivalent structures and products. Moreover, features or aspects of various example embodiments may be mixed and matched (even if such combination is not explicitly described herein) without departing from the scope of the invention.

What is claimed is:

1. A microscope, comprising:
   a sample holder;
   an objective for imaging at least a part of a sample held by the sample holder;
   a detection module, downstream of the objective, including a first detector configured to record the part of the sample imaged by the objective;
   a control unit configured to set the focus position of the objective in a first direction such that the detection module can record the part of the sample imaged by the objective; and
   a focusing module, downstream of the objective, configured to maintain a set focus position of the objective,
   wherein the focusing module comprises the control unit, a second detector and first focusing optics with adjustable focal length, and is switchable into a focus-hold mode,
   wherein an intensity-modulated object is imaged into the sample via the first focusing optics and the objective, and an image of the imaged object is recorded by the second detector,
   wherein the control unit is configured to hold the focus position of the objective on the set focus position, on the basis of the recording of the second detector,
   wherein the focusing module, in the case of a set focal length of the first focusing optics, has a capture range in the first direction,
   wherein a set focus position lying within the capture range can be held and a set focus position lying outside of the capture range cannot be held, and
   wherein the capture range is shifted in the first direction by adjustment of the focal length of the first focusing optics.

2. The microscope according to claim 1, wherein the shifting of the capture range in and contrary to the first direction brings a set focus position lying above or below the capture range into the capture range.

3. The microscope according to claim 2, wherein the focusing module is configured to be switchable into a search mode, in which, if no image of the imaged object can be recorded by the second detector, with the focus position of the objective being maintained, the focal length of the first focusing optics is altered until the second detector records an image of the imaged object.

4. The microscope according to claim 1, wherein the focusing module is configured to be switchable into a search mode, in which, if no image of the imaged object can be recorded by the second detector, with the focus position of the objective being maintained, the focal length of the first focusing optics is altered until the second detector records an image of the imaged object.

5. The microscope according to claim 1, wherein the focusing module is switchable into a first z-stack mode, in which various focal lengths of the first focusing optics are set successively with the focus-hold mode switched on, such that the focus position of the objective is thereby set to the positions in the first direction which are assigned to the various focal lengths.

6. The microscope according to claim 1, wherein the focusing module is switchable into a second z-stack mode, in which various setpoint values are successively predefined for the focus-hold mode, such that the corresponding focus positions of the objective are thereby set.

7. The microscope according to claim 6, wherein the focal length of the first focusing optics is altered in the second z-stack mode, in order to scan a larger z-stack range.

8. The microscope according to claim 1, wherein the focusing module is configured such that it is switchable into a search mode, in which, if no image of the imaged object can be recorded by the second detector, with the focus position of the objective being maintained, the focal length of the first focusing optics is altered until the second detector records an image of the imaged object.

9. The microscope according to claim 1, wherein the focusing module is switchable into a focus-setting mode, in which, in a first step, by alteration of the distance between the objective and the holder, the position of the image of the imaged object on the second detector coincides with a predefined position, which corresponds to a focus position of the objective that is to be set, and in which, in a second step following the first step, the focusing module is switched into the focus-hold mode.

10. The microscope according to claim 9, wherein for the first step, the focus position of the imaged object is set such that it lies at a greater distance from the objective than the focus position of the objective, and in which, in the second step, the focal length of the first focusing optics is altered such that the focus position of the imaged object coincides with the focus position of the objective.

11. The microscope according to claim 1, wherein the focusing module is switchable into a first z-stack mode, in which various focal lengths of the first focusing optics are set successively with the focus-hold mode switched on, such that the focus position of the objective is thereby set to the positions in the first direction which are assigned to the various focal lengths.

12. The microscope according to claim 1, wherein the focusing module is switchable into a second z-stack mode, in which various setpoint values are successively predefined for the focus-hold mode, such that the corresponding focus positions of the objective are thereby set.

13. The microscope according to claim 12, wherein the focal length of the first focusing optics is altered in the second z-stack mode, in order to scan a larger z-stack range.

14. The microscope according to claim 1, wherein the image plane recorded by the second detector intersects the set focus position.

15. A microscope, comprising:
a sample holder;
an objective for imaging at least a part of a sample held by the sample holder;
a detection module, downstream of the objective, including a first detector configured to record the part of the sample imaged by the objective;
a control unit configured to set the focus position of the objective in a first direction such that the detection module can record the part of the sample imaged by the objective; and
a focusing module, downstream of the objective, configured to maintain a set focus position of the objective,
wherein the focusing module comprises the control unit, a second detector and first focusing optics with adjustable focal length, and is switchable into a focus-hold mode,
wherein an intensity-modulated object is imaged into the sample via the first focusing optics and the objective, and an image of the imaged object is recorded by the second detector,
wherein the control unit is configured to hold the focus position of the objective on the set focus position, on the basis of the recording of the second detector,
wherein the focusing module is switchable into a focus-setting mode, in which, in a first step, by alteration of the distance between the objective and the holder, the position of the image of the imaged object on the second detector coincides with a predefined position, which corresponds to a focus position of the objective that is to be set, and in which, in a second step following the first step, the focusing module is switched into the focus-hold mode, and
wherein for the first step, the focus position of the imaged object is set such that it lies at a greater distance from the objective than the focus position of the objective, and in which, in the second step, the focal length of the first focusing optics is altered such that the focus position of the imaged object coincides with the focus position of the objective.

16. A microscope, comprising:
a sample holder;
an objective for imaging at least a part of a sample held by the sample holder;
a detection module, downstream of the objective, including a first detector configured to record the part of the sample imaged by the objective;
a control unit configured to set the focus position of the objective in a first direction such that the detection module can record the part of the sample imaged by the objective; and
a focusing module, downstream of the objective, configured to maintain a set focus position of the objective,
wherein the focusing module comprises the control unit, a second detector and first focusing optics with adjustable focal length, and is switchable into a focus-hold mode,
wherein an intensity-modulated object is imaged into the sample via the first focusing optics and the objective, and an image of the imaged object is recorded by the second detector,
wherein the control unit is configured to hold the focus position of the objective on the set focus position, on the basis of the recording of the second detector
wherein the focusing module is switchable into a second z-stack mode, in which various setpoint values are successively predefined for the focus-hold mode, such that the corresponding focus positions of the objective are thereby set, and
wherein the focal length of the first focusing optics is altered in the second z-stack mode, in order to scan a larger z-stack range.

* * * * *